(12) United States Patent
Katayama

(10) Patent No.: US 6,997,965 B2
(45) Date of Patent: Feb. 14, 2006

(54) METHOD FOR THE GASIFICATION OF COAL

(75) Inventor: Yukuo Katayama, Tokyo (JP)

(73) Assignees: Toyo Engineering Corporation, Tokyo (JP); The Institute of Applied Energy, Tokyo (JP)

( * ) Notice: Subject to any disclaimer, the term of this patent is extended or adjusted under 35 U.S.C. 154(b) by 750 days.

(21) Appl. No.: 09/851,700

(22) Filed: May 8, 2001

(65) Prior Publication Data

US 2001/0054256 A1 Dec. 27, 2001

(30) Foreign Application Priority Data

May 9, 2000 (JP) .............................. 2000-136268

(51) Int. Cl.
*C10J 3/46* (2006.01)
(52) U.S. Cl. .............................. 48/202; 48/200; 48/73; 48/99; 48/204; 48/209; 48/210; 48/197 FM
(58) Field of Classification Search ................ 48/71, 48/73, 77, 78, 98, 99, 101, 108, 111, 119, 48/200, 202, 204, 209, 210, 197 FM; 204/538; 205/628
See application file for complete search history.

(56) References Cited

U.S. PATENT DOCUMENTS

| | | | |
|---|---|---|---|
| 2,595,234 A | 5/1952 | Du Boise Eastman | 48/202 |
| 3,871,839 A | 3/1975 | Moody | 48/197 |
| 4,153,427 A | 5/1979 | Bissett et al. | 48/86 |
| 4,590,760 A | 5/1986 | Goebel et al. | |
| 4,663,931 A | 5/1987 | Schiffers et al. | |

FOREIGN PATENT DOCUMENTS

FR 2 552 443 3/1985
WO 95 31423 11/1995

OTHER PUBLICATIONS

Jan Eurlings, Europower, Winter 1993 "Buggenum The World's Largest Coal Gasification Plant on Schedule for Demostration" pp 55-56 and 58-61.*
U.S. Department of Energy Office of Fossil Energy, Market-based Advanced Coal Power Systems, Final Report, may 1999, 4.1.4.9, p. 4.1-15.
S.W. Gouse et al., "Integration of Fossil and Renewable Energy Technologies to Mitigate Carbon Dioxide", 1993, Energy Convert. Mgmi vol. 34, No. 9-11, 1023-1030.

* cited by examiner

Primary Examiner—Basia Ridley
(74) Attorney, Agent, or Firm—Pitney Hardin LLP

(57) ABSTRACT

A method of the gasification of coal using oxygen and steam is provided wherein the coal is gasified at a temperature of from 1000 to 2500° C. and a pressure of from 1 to 100 $kg/cm^2$ using oxygen generated by electrolyzing water and steam having a temperature of from 300 to 600° C. attained by heat exchange heat with a high temperature gas generated by the coal gasification. In the method, a remarkably higher efficiency and low carbon dioxide emission is attained.

6 Claims, 1 Drawing Sheet

METHOD FOR THE GASIFICATION OF COAL

BACKGROUND OF THE INVENTION

1. Field of the Invention

The present invention relates to a method for the gasification of coal, more specifically to a method for the gasification of coal wherein electric power generated by wind power, waterpower or solar energy can be effectively utilized.

2. Description of the Prior Art

Partial oxidation gasification and hydrogenation gasification are known as conventional methods of coal gasification. An efficiency to produce clean gas from coal is only about 70% in the former and no more than 75% even in the latter, which is the latest method.

The following Table 1 shows an example of heat balance in the partial oxidation gasification.

TABLE 1

| | Heating value per kg of coal |
|---|---|
| Higher heating value (HHV) of feed coal | 7330 Kcal/kg |
| Heating value of gas generated from a gasifier | 6050 Kcal/kg |
| Amount of gasification gas consumed in the gas cleaning processes | −910 Kcal/kg |
| Available energy | 5110 Kcal/kg |
| Efficiency | 70.1% |

As described above, in the conventional partial oxidation gasification, about 70% of the HHV of the coal, 7330 Kcal/kg, is available as a clean gas. In the conventional partial oxidation gasification, a part of feed coal is burnt to generate electricity or steam which is used for air separation to produce oxygen, as described in Jan Eurlings, Europower, 55–61,winter 1993, and in U.S. Department of Energy Office of Fossil Energy, "Market-based Advanced Coal Power Systems, Final Report,4.1.4.9, May 1999. " As a result, an efficiency of producing clean gas in the coal gasification is no more than about 70% and an emission of carbon dioxide is not reduced. This prevents one from utilizing gases produced by the conventional coal gasification. Moreover, coal emits more carbon dioxide per unit heating value than petroleum or natural gas, so that its use is under restriction to prevent the greenhouse effect.

An integrated system of photovoltaics (PV) and an integrated coal gasification combined cycle (IGCC) is described in S. W. Gouse et al., "Integration of Fossil and Renewable Energy Technologies to Mitigate Carbon Dioxide", Energy Convert. Mgmi Vol 34, No. 9–11, 1023–1030, 1993. In the system, the PV plant is equipped with an electrolyzer to produce hydrogen and oxygen from water. The object of the invention is to mitigate carbon dioxide from IGCC and, therefore, none of the present features to improve a gasification efficiency is described.

SUMMARY OF THE INVENTION

The present invention provides a method for the gasification of coal wherein a remarkably higher efficiency is attained and very clean gas is produced with extremely low carbon dioxide emission.

The present inventor has directed attention to the facts that, in the conventional partial oxidation gasification, the oxygen is produced by air separation using electric power or steam generated by burning a part of feed coal, which results in a low efficiency of producing clean gas and an increased amount of carbon dioxide emission. After an intensive study, the present inventor has found that a remarkably higher efficiency and higher heating value of a gas obtained by gasification can be achieved with very low carbon dioxide emission by producing oxygen by water electrolysis instead of the aforesaid method of producing oxygen and, in a first aspect of the invention, by mixing hydrogen produced by the water electrolysis with a gas produced by gasification. Also it has been found in a second aspect of the invention that clean gas having a higher heating value can be produced with a remarkably higher efficiency as well as a very low carbon dioxide by utilizing water electrolysis to produce oxygen and hydrogen and producing high-temperature steam from the oxygen and the hydrogen produced by the water electrolysis. Particularly, utilizing renewable energy for the water electrolysis, such as wind power, waterpower, and the solar energy, can significantly increase economical efficiency.

Among the renewable energy, the solar energy and the wind power vary from moment to moment, which makes it impossible to use heat produced from these types of energy directly for the gasification. In the present invention, the heat is converted at first to electric power which is then used to electrolyze water to produce oxygen and hydrogen, and the gasification is carried out using the oxygen or the oxygen and the hydrogen, whereby the renewable energy is effectively utilized. It is preferred that oxygen and hydrogen be produced by the electric power from the solar energy or wind power and stored in an amount per day sufficient to run a gasification reactor for 24 hours. By doing so, one can maintain higher efficiency of operation to thereby further increase economical efficiency.

Thus, a first aspect of the invention is (1) a method of the gasification of coal using oxygen and steam wherein the coal is gasified at a temperature of from 1000 to 2500° C. and a pressure of from 1 to 100 kg/cm$^2$ using oxygen generated by electrolyzing water and steam heated to a temperature of from 300 to 600° C. through a heat exchange with high-temperature gas from the coal gasifier.

Preferred embodiments of the above invention are as follows.

(2) The method described in (1) above, wherein hydrogen generated by the water electrolysis is mixed with the gas generated by the gasification whereby a gas mixture is produced.

(3) The method described in (1) or (2) above, wherein oxygen is introduced in an amount of 0.3 to 1.1 times as much as a required molar amount of oxygen calculated by subtracting a molar amount of oxygen in the feed coal from a half of the molar amount of carbon in the feed coal.

(4) The method described in (1) or (2) above, wherein oxygen is introduced in an amount of 0.5 to 1.0 time as much as a required a molar amount of oxygen calculated by subtracting a molar amount of oxygen in the feed coal from a half of the molar amount of carbon in the feed coal.

(5) The method described in any one of (1) to (4) above, wherein steam is introduced in an amount of 0.1 to 1.5 times as much as a weight of the coal used in the gasification.

(6) The method described in any one of (1) to (4) above, wherein the steam is introduced in an amount of 0.15 to 0.6 time as much as a weight of the coal used in the gasification.

(7) The method described in any one of (1) to (6) above, wherein the gasification is performed at a temperature of from 1300 to 2000° C.

(8) The method described in any one of (1) to (6) above, wherein the gasification is performed at a temperature of from 1500 to 2000° C.

(9) The method described in any one of (1) to (8) above, wherein the gasification is performed at a pressure of from 15 to 80 kg/cm$^2$.

(10) The method described in any one of (1) to (9) above, wherein the electrolysis of water is carried out using an electric power generated by wind power, waterpower, or the solar energy.

(11) The method described in any one of (1) to (9) above, wherein the electrolysis of water is carried out using an electric power generated by wind power, or the solar energy.

(12) The method described in (10) or (11) above, wherein at least a sufficient amount of oxygen for the 24 hours operations of coal gasification is produced in the electrolysis of water.

(13) The method described in any one of (1) to (12) above wherein the steam of 300 to 600° C. produced by heat exchange with high-temperature gas generated by the gasification is heated to 1000 to 1500° C. by condensing the solar energy and the heated steam is used for the gasification.

(14) The method described in any one of (1) to (13) above, wherein pulverized coal is supplied to gasification reactor by a pneumatic transportation method using carbon dioxide, nitrogen, or hydrogen, or by a water slurry method. A second aspect of the invention is

(15) a method of the gasification of coal using steam, wherein the coal is gasified at a temperature of from 1000 to 2500° C. and a pressure of from 1 to 100 kg/cm$^2$ using steam having a temperature of from 2,000 to 2700° C. prepared by oxidation of hydrogen. Both hydrogen and oxygen are generated by electrolyzing water.

Preferred embodiments of the above invention are as follows.

(16) The method described in (15) above, wherein oxygen is introduced in an amount of 1 to 1.5 times as much as a required molar amount of oxygen calculated by subtracting a molar amount of oxygen in the feed coal from a half of the molar amount of carbon in the feed coal.

(17) The method described in (15) above, wherein oxygen is introduced in an amount of 1.1 to 1.3 times as much as a required molar amount of oxygen calculated by subtracting a molar amount of oxygen in the feed coal from a half of the molar amount of carbon in the feed coal.

(18) The method described in (16) or (17) above, wherein hydrogen is introduced in an amount of from 2 to 3 times as much as a required molar amount of oxygen calculated by subtracting a molar amount of oxygen in the feed coal frog a half of the molar amount of carbon in the feed coal.

(19) The method described in (16) or (17) above, wherein hydrogen is introduced in an amount of from 2.0 to 2.6 times as much as a required molar amount of oxygen calculated by subtracting A molar amount of oxygen in the feed coal from a half of the molar amount of carbon in the feed coal.

(20) The method described in any one of (16) to (19) above, wherein the temperature of steam is in the range of from 2000 to 2700° C.

(21) The method described in any one of (16) to (20) above, wherein the coal gasification is carried out at a temperature of from 1300 and 2000° C.

(22) The method described in any one of (16) to (21) above, wherein the coal gasification is carried out at a pressure of from 15 to 80 kg/cm$^2$.

(23) The method described in any one of (16) to (22) above, wherein the electrolysis of water is carried out using an electric power generated by wind power, waterpower, or the solar energy.

(24) The method described in any one of (16) to (22) above, wherein the electrolysis of water is carried out using an electric power generated by wind power or the solar energy.

(25) The method described in (23) or (24) above, wherein at least a sufficient amount of oxygen and hydrogen for the gasification of coal of 24 hours is produced in the electrolysis of water.

(26) The method described in any one of (17) to (25) above, wherein pulverized coal is supplied to gasification reactor by a pneumatic transportation method using carbon dioxide, nitrogen, or hydrogen, or by a water slurry method.

DESCRIPTION OF THE PREFERRED EMBODIMENTS

Figure 1:
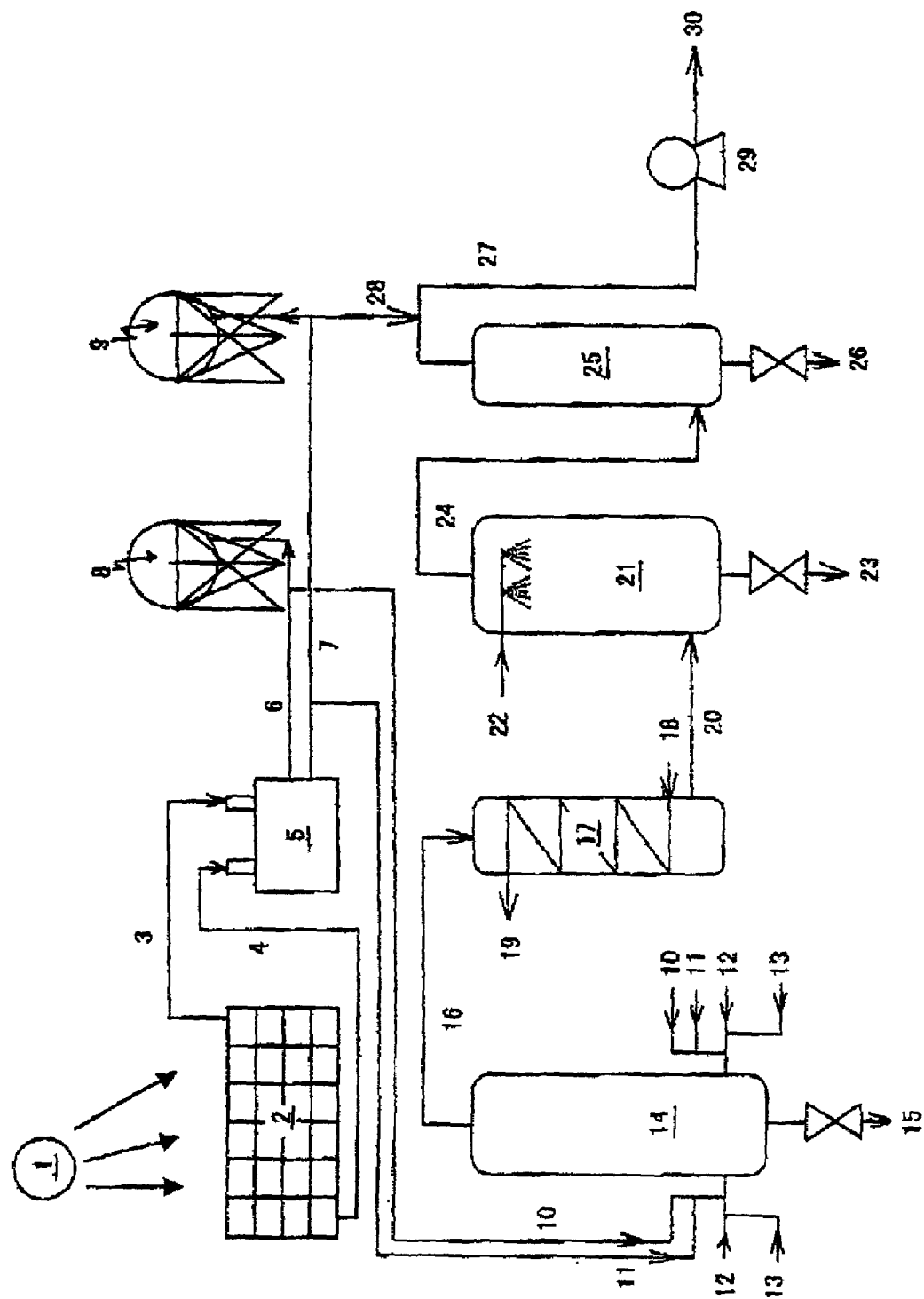
FIG. 1 shows an example of a process flow of the first and the second aspects of the present invention.

The first and the second aspects of the present invention will be explained in detail with reference to FIG. 1. In the process shown in FIG. 1, solar energy is used for electrolysis of water. Direct-current power is generated with a generator using heat from a solar collector or power generation cell 2 and supplied via electric wires 3 and 4 to electrolysis bath 5. In electrolysis bath 5, 1 mole of water is electrolyzed into 0.5 mole of oxygen and 1 mole of hydrogen. The produced oxygen is sent via line 6 to oxygen gasholder 8 and stored therein and, similarly, hydrogen is sent via line 7 to hydrogen gasholder 9 and stored therein.

Pulverized coal is directed via pulverized coal supply line 12 to gasification reactor 14 kept at a specific temperature and pressure described later in the specification. The pulverized coal is supplied to gasification reactor 14 preferably by a pneumatic transportation method using carbon dioxide, nitrogen, or hydrogen, or by a water slurry method. Here, the pulverized coal preferably has a particle size of from 100 to 200 meshes.

In the first aspect of the invention, oxygen is introduced in the aforesaid gasification reactor 14 from oxygen gasholder 8 via oxygen introducing line 10. The amount of oxygen introduced in gasification reactor 14 is preferably in the range of 0.3 to 1.1 times, more preferably 0.5 to 1.0 times, as much as a required molar amount of oxygen calculated by subtracting a molar amount of oxygen in the feed coal from a half of the molar amount of carbon in the feed coal.

Steam is also introduced in gasification reactor 14 from steam line 13. At night, steam of from 300 to 600° C. from waste heat boiler 17 is introduced which steam is produced by heat exchange with high-temperature gas generated by the gasification. Preferably, the steam is introduced in an amount of 0.1 to 1.5 times, more preferably 0.15 to 0.6 time, as much as a weight of the feed coal. In the daytime, the solar is focused on a ceramic tube generating far-infrared light, for example, and steam of 300° C. to 600° C. from waste heat boiler 17 is passed therein to be heated preferably to a temperature of from 1000 to 1500° C. The high-temperature thus obtained is introduced in an amount of from 0.1 to 1.5 times, more preferably 0.15 to 0.6 times, as much as a weight of the feed coal. Steam reforming of coal is advantageously promoted by introducing the high-temperature steam to thereby preferably make a temperature of the gasification between 1500 and 2000° C.

When solar energy is used, the steam from waste heat boiler 17 is introduced in the aforesaid amount both in the daytime and at night which steam has been heat exchanged with high-temperature gas generated by the gasification to have a temperature of from 300 to 600° C.

By introducing oxygen and steam in the gasification reactor in the manner as described above, the partial oxidation gasification and steam reforming gasification of the coal are carried out at a temperature of from 1000 to 2500° C., preferably from 1300 and 2000° C. and a pressure of from 1 to 100 kg/cm$^2$, preferably from 15 to 80 kg/cm$^2$.

In the second aspect of the invention, oxygen is introduced in the aforesaid gasification reactor 14 via oxygen introducing line 10 from oxygen gasholder 8. The amount of the introduced oxygen is preferably in the range of 1 to 1.5 times, more preferably 1.0 to 1.3 times, as much as a required molar amount of oxygen calculated by subtracting a molar amount of oxygen in the feed coal from a half of the molar amount of carbon in the feed coal.

Hydrogen is also introduced in the aforesaid gasification reactor 14 via hydrogen introducing line 11 from hydrogen gasholder 9 preferably in an amount of from 2 to 3 times, more preferably 2.0 to 2.6 times, as much as a required molar amount of oxygen calculated by subtracting a molar amount of oxygen in the feed coal from a half of the molar amount of carbon in the feed coal. By introducing oxygen and hydrogen in the gasification reactor in the manner as described above, the steam reforming gasification is carried out at a temperature of from 1000 and 2500° C., preferably from 1300 and 2000° C. Further, the reactor is pressurized from 1 to 100 kg/cm$^2$ preferably from 15 to 80 kg/cm$^2$.

When a temperature of the gas generated in the gasification reactor exceeds 1500° C., a steam cooling unit provided on an internal wall of the reactor is not enough, so that steam of about 300° C. or gasification gas cooled to about 300° C. is introduced in the gasification reactor to thereby cool the gas preferably to about 1200 C. to protect the reactor wall.

Most of coal ash melted at a high temperature by partial oxidation of coal is discharged as slag from exhaust line 15. Preferably, the gasification gas cooled to about 1200°C. is transferred via line 16 to waste heat boiler 17. In waste heat boiler 17, the gas is preferably cooled to about 250° C. by steam from low-temperature steam line 18. High-temperature and high-pressure steam is produced in waste heat boiler 17 is recovered from high-temperature steam line 19 and used for the gasification in the first aspect. Any known waste heat boiler can be used for waste heat boiler 17 in the present invention.

The gas cooled, preferably, to about 250° C. is preferably transferred via line 20 to water scrubber 21 wherein ammonia and a trace amount of remaining dust are removed and the gas exits from line 23. The gas, cleaned with water and cooled to about 40° C., is preferably transferred to acidic gas absorber 25 via line 24 to be free from hydrogen sulfide. Acidic gases such as hydrogen sulfide go out via line 26. The purified gas is preferably mixed with hydrogen from line 28 and used as product gas 30 via line 27 by blower 29.

The present invention will be explained in detail by the following Examples, but not limited to those.

Each Example is a result of computer simulation, wherein 1 t/day of coal with composition shown in Table 2 is gasified according to the present invention. Values corresponding to predetermined amounts of coal, oxygen, hydrogen, and steam at predetermined temperatures are input to a computer, and material balance and heat balance of the gasification are calculated.

Elemental composition of the coal used in the Examples is as shown in Table 2.

TABLE 2

| Element | Content (DAF-base) |
| --- | --- |
| C | 83.64 wt % |
| H | 5.16 wt % |
| N | 1.32 wt % |
| S | 1.10 wt % |
| O | 8.78 wt % |

An ash content and higher heating value (HHV) of the coal are as shown in Table 3.

TABLE 3

| Ash content | 8.90 wt % |
| --- | --- |
| HHV | 7330 kcal/kg · coal |

EXAMPLE 1

Using the process flow shown in FIG. 1, gasification of the coal with the aforesaid composition is carried out. The solar energy is used to electrolyze water. This Example is based on the first aspect of the invention.

Three thousand kw/day of direct-current power is generated in the power generator using heat from a solar collector or from power generation cell 2. The direct-current power is transmitted via electric wires 3 and 4 to electrolysis bath 5. In electrolysis bath 5,843 kg/day of water is electrolyzed into 750 kg/day (23.44 moles/day) of oxygen and 93 kg/day (46.88 moles/day) of hydrogen. The produced oxygen is sent via line 6 to oxygen gasholder 8 and stored therein. Similarly, the hydrogen is sent via line 7 to hydrogen gasholder 9 and stored therein.

One thousand kg/day of pulverized coal is directed via line 2 to gasification reactor 14 kept at about 1335° C. At the same time, 750 kg/day of oxygen is introduced from oxygen gasholder 8 via oxygen introducing line 10. Also, 500 kg/day of steam at 500° C. is introduced from steam line 13 and the coal is partial oxidation gasified and steam reforming gasified at about 1335° C. Most of the coal ashes melt by the combustion at a high temperature in gasification reactor 14 exits as slag from line 15 in a rate of 96 kg/day.

Gas produced by the gasification, which is hereinafter referred to as crude gas, is cooled to about 1200° C. and sent via line 16 to waste heat boiler 17 in a rate of 2154 kg/day. In waste heat boiler 17, the gas is cooled to about 250° C. by steam from low-temperature steam line 18. Steam with a high-pressure and a high-temperature of 500° C. is produced by heat exchange in waste heat boiler 17 and is recovered in high-temperature line 19. Five hundred kg/day out of the steam is introduced in the gasification reactor.

The crude gas cooled to about 250° C. is sent via line 20 to water scrubbing column 21 where 30g/day of ammonia and a trace amount of remaining dust are removed by water shower 22 and exits from line 23. The gas scrubbed with water and cooled to about 40° C. is sent via line 24 to acidic gas absorber column 25 where hydrogen sulfide is removed. Hydrogen sulfide in a rate of 10.4 kg/day and other acidic gases are withdrawn via line 26. The purified gasification gas is mixed with 47 kg/day of hydrogen from line 28 and then sent by blower 29 via line 27 to be used as product gas 30. Composition of the product gas is as shown in Table 4.

TABLE 4

| Component | Content (vol. %) |
|---|---|
| $H_2$ | 58.4 |
| CO | 39.9 |
| $CH_4$ | 1.4 |
| $N_2$ | 0.3 |
| Total | 100.0 |

Most of the energy necessary to purify the gas and pulverize the coal can be covered by energy of the steam of a high-temperature and a high-pressure from the waste heat boiler, and the deficient amount of energy of 820 M cal/day is supplied by burning the product gas or hydrogen. A higher heating value of the product gas is thus 121% of the higher heating value of the feed coal as seen below:

(heating value of the product gas 30 –deficient energy of 820 Mcal/day)×100/(energy of the feed coal of 7330 Mcal/day)=(9693 Mcal/day−820 Mcal/day) ×100/7330 Mcal/day=121.

By taking the solar energy in, clean energy is produced from coal and $CO_2$ emission of the clean energy is the same as that of petroleum Here, the product gas emits about 288 g of $CO_2$/1000 kcal and petroleum emits about 285 g of $CO_2$/1000 kcal.

EXAMPLE 2

Using the process flow shown in FIG 1, gasification of the coal with the aforesaid composition is carried out. The solar energy is used to electrolyze water. This Example is based on the second aspect of the invention.

Three thousand and seven hundred kW/day of direct-current power is generated in power generator using heat from a solar collector or from power generation cell 2 The direct-current power is transmitted via electric wires 3 and 4 to electrolysis bath 5. In electrolysis bath 5, 1045 kg/day of water is electrolyzed into 928 kg/day (29 moles/day) of oxygen and 117 kg/day (58 moles/day) of hydrogen. The produced oxygen is sent via line 6 to oxygen gasholder 8 and stored therein and, similarly, the hydrogen is sent via line 7 to hydrogen gasholder 9 and stored therein.

One thousand kg/day of pulverized coal is sent via line 12 to gasification reactor 14 kept at about 1220° C. At the same time, 928 kg/day of oxygen is introduced from oxygen gas holder 8 via oxygen introducing line 10 and 117 kg/day of hydrogen is introduced from hydrogen gas holder 9 via hydrogen introducing line 11. The oxygen and the hydrogen are reacted with each other to become high-temperature steam which is used for steam reforming gasification of the coal at about 1220° C. Most of the coal ashes melt at the high temperature in gasification reactor 14 exits as slag from line 15 in a rate of 96 kg/day.

The crude gas cooled to about 1200° C. is sent via line 16 to waste heat boiler 17 in a rate of 1973 kg/day. In waste heat boiler 17, the gas is cooled to about 250° C. by steam from low-temperature steam line 18. Steam with a high-pressure and a high-temperature of 500° C. is produced by heat exchange in waste heat boiler 17 and is recovered in high-temperature line 19.

The crude gas is treated in the same manner as in Example 1 to become product gas 30. Composition of the product gas is as shown in Table 5.

TABLE 5

| Component | Content (vol. %) |
|---|---|
| $H_2$ | 56.1 |
| CO | 43.6 |
| $CH_4$ | 0 |
| $N_2$ | 0.3 |
| Total | 100.0 |

Most of the energy necessary to purify the gas and pulverize the coal can be covered by energy of by the steam of a high-temperature and a high-pressure from the waste heat boiler, and the deficient amount of energy of 830 M cal/day is supplied by burning the product gas or hydrogen. A higher heating value of the product gas is thus 122% of the higher heating value of the feed coal as seen below:

(heating value of the product gas 30–deficient energy of 830 Mcal/day)×100/(energy value of the feed coal of 7330 Mcal/day)=(9801 Mcal/day−830 Mcal/day)×100/7330 Mcal/day=122.

By taking the solar energy in, clean energy is produced from coal and $CO_2$. emission of the clean energy is almost the same as that of petroleum. Here, the product gas emits about 285 g of $CO_2$/1000 kcal and petroleum emits about 285 g of $CO_2$/1000 kcal.

As basic data, material balance and fuel consumption in the processes in Examples 1 and 2 are calculated by computer simulation based on materials at the inlet of the gasification reactor and their calorific values and shown in Table 6.

TABLE 6

| | | Method | | | | | |
|---|---|---|---|---|---|---|---|
| | | Example 1 | | | Example 2 | | |
| | | Process stream No. | | | | | |
| | Section No. | 14 kg · mol | 16 kg · mol | 30 kg · mol | 14 kg · mol | 16 kg · mol | 30 kg · mol |
| Feed Coal | | | | | | | |
| 12 Coal feed rate 1000 kg/day Elemental composition (DAF) | | | | | | | |
| C = 83.64 | | 83.440 | | | 63.440 | | |
| H = 5.16 | | 23.320 | | | 23.320 | | |
| N = 1.32 | | 0.430 | | | 0.430 | | |

TABLE 6-continued

| | Method | | | | | |
|---|---|---|---|---|---|---|
| | Example 1 | | | Example 2 | | |
| | Process stream No. | | | | | |
| Section No. | 14 kg·mol | 16 kg·mol | 30 kg·mol | 14 kg·mol | 16 kg·mol | 30 kg·mol |
| S = 1.10 | 0.310 | | | 0.310 | | |
| O = 8.78 | 2.500 | | | 2.500 | | |
| Ash % 8.90 | 89.000 | | | 89.000 | | |
| Moisture (%) 0.00 | 0.000 | | | 0.000 | | |
| Gasifier | | | | | | |
| 10 Oxygen for gasification (40° C.) | 23.440 | | | 29.000 | | |
| 11 Hydrogen for gasification (40° C.) | 0.000 | | | 58.000 | | |
| 13 Steam for gasification (500° C.) | 27.750 | | | 0.000 | | |
| Gas characteristics | | | | | | |
| 28 $H_2$ from electrolysis bath | | 0.000 | 46.880 | | 0.000 | 0.000 |
| Carbon loss | | 0.640 | 0.000 | | 0.640 | 0.000 |
| $H_2$ | | 33.970 | 33.970 | | 80.910 | 80.810 |
| CO | | 55.200 | 55.200 | | 62.800 | 62.800 |
| $CO_2$ | | 5.710 | 0.000 | | 0.000 | 0.000 |
| $CH_4$ | | 1.890 | 1.890 | | 0.000 | 0.000 |
| COS | | 0.008 | 0.000 | | 0.008 | 0.000 |
| $H_2S$ | | 0.310 | 0.000 | | 0.310 | 0.000 |
| $N_2$ | | 0.430 | 0.430 | | 0.430 | 0.430 |
| $NH_3$ | | 0.001 | 0.000 | | 0.000 | 0.000 |
| $H_2O$ | | 13.010 | 0.000 | | 0.200 | 0.000 |
| Total(kg·mol) | | 111.169 | 91.490 | | 145.298 | 144.040 |
| Total heat content (M cal/day) | | 6,491.000 | 9,693.000 | | 9,801.000 | 9,801.000 |
| Process consumption fuel (M cal/day) | | 820.000 | | | 830.000 | |
| Overall efficiency (Exit 30/Inlet 12) | | 132.2% | | | 133.7% | |
| Net efficiency (Exit 30 − Process consumption fuel) (Inlet 12) | | 121.1% | | | 122.4% | |

According to the present invention, clean energy is produced from coal which emits about 1.3 times as much $CO_2$ as petroleum does, by using the solar energy, wind power, or waterpower to electrolyze water, and gasifying coal using oxen and hydrogen produced by the electrolysis of water. The produced energy is accompanied with $CO_2$ emission of about 285 to 288 g/1000 Kcal, almost the same as that of petroleum, and a heat value of 3000 Kcal/Nm³ or more. The higher heat value of the clean gas is 121% of that of the feed coal. This means that about 4600 Kcal of renewable energy per kg of coal is taken in the product gas and, therefore, the present method of the coal gasification is more harmless to the global environment than conventional gasification, The product gas of the present gasification contains so much as 55% of hydrogen or more. This product gas can be used for producing methanol that can be easily transported from a coalmine to consumption sites.

The present invention provides a method of the coal gasification wherein a remarkably higher conversion is attained and very clean gas with extremely low $CO_2$ emission is produced. Preferably, wind power, waterpower, or the solar energy, particularly wind power or the solar energy that vary from moment to moment, is converted to electric power which is used to electrolyze water to produce oxygen and hydrogen. Then, using the oxygen and hydrogen, the coal gasification is performed to produce carbon monoxide and hydrogen whereby the coal is converted with a high efficiency to a clean gas with as little $CO_2$ emission as that from petroleum.

What is claimed is:

1. A method for gasification of coal using steam, wherein the coal is gasified at a temperature of from 1000 to 2500° C. and a pressure of from 1 to 100 kg/cm² using steam having a temperature of from 2,000 to 2,700° C., which steam is prepared by reacting hydrogen with oxygen, both hydrogen and oxygen being generated by electrolyzing water.

2. The method according to claim 1, wherein oxygen is introduced in an amount of 1 to 1.5 times as much as a required molar amount of oxygen calculated by subtracting a molar amount of oxygen in the feed coal from a half of the molar amount of carbon in the feed coal.

3. The method according to claim 1, wherein hydrogen is introduced in an amount of from 2 to 3 times as much as a required molar amount of oxygen calculated by subtracting a molar amount of oxygen in the feed coal from a half of the molar amount of carbon in the feed coal.

4. The method according to claim 1, wherein the temperature of steam is in the range of from 2000 to 2700° C.

5. The method according to claim 1, wherein the electrolysis of water is carried out using electric power generated by wind power, waterpower, or solar energy.

6. The method according to claim 5, wherein at least a sufficient amount of oxygen or at least sufficient amounts of oxygen and hydrogen for a 24 hour operation of coal gasification is produced in the electrolysis of water.

* * * * *